United States Patent
Hamm et al.

(10) Patent No.: US 12,546,341 B2
(45) Date of Patent: Feb. 10, 2026

(54) METHOD AND SYSTEMS FOR CONTROLLING FLUID TEMPERATURE IN A HYDRAULIC SYSTEM OF AN AIRCRAFT POWERED BY AN HPP

(71) Applicant: Airbus Operations GmbH, Hamburg (DE)

(72) Inventors: Martin Hamm, Hamburg (DE); Rolf Gössing, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/903,877

(22) Filed: Oct. 1, 2024

(65) Prior Publication Data
US 2025/0109756 A1    Apr. 3, 2025

(30) Foreign Application Priority Data
Oct. 2, 2023 (EP) .................................... 23201292

(51) Int. Cl.
*F15B 21/045* (2019.01)
*F15B 21/0427* (2019.01)

(52) U.S. Cl.
CPC ........ *F15B 21/045* (2013.01); *F15B 21/0427* (2019.01); *F15B 2211/857* (2013.01)

(58) Field of Classification Search
CPC ......................... F15B 21/045; F15B 21/0427
See application file for complete search history.

(56) References Cited

U.S. PATENT DOCUMENTS

| | | |
|---|---|---|
| 5,109,672 A | 5/1992 | Chenoweth et al. |
| 2010/0170238 A1* | 7/2010 | Behr ................ B64C 13/40 60/459 |
| 2019/0186512 A1 | 6/2019 | Didey |
| 2019/0338793 A1* | 11/2019 | Uhlman ............ F15B 20/005 |
| 2020/0200196 A1* | 6/2020 | Bacchiega ........ G05D 23/02 |
| 2023/0174222 A1 | 6/2023 | Hagihara et al. |

FOREIGN PATENT DOCUMENTS

| | | |
|---|---|---|
| CA | 2990136 A1 | 1/2017 |
| EP | 4102084 A1 | 12/2022 |
| JP | 2019157908 A * | 9/2019 |

OTHER PUBLICATIONS

Extended European Search Report for EP Application No. 23201292.2 dated Mar. 14, 2024, 14 pages.

* cited by examiner

*Primary Examiner* — Thomas E Lazo
(74) *Attorney, Agent, or Firm* — Nixon & Vanderhye P.C.

(57) ABSTRACT

A hydraulic system (12) for an aircraft (10), wherein the hydraulic system (12) includes a hydraulic power pack (14), a hydraulic fluid reservoir (28) and a hydraulic pump (30), a hydraulic consumer (18), a high-pressure supply line (38) supplying the hydraulic consumer (18) with hydraulic fluid under higher pressure, and a low-pressure return line (40) returning hydraulic fluid under lower pressure from the hydraulic consumer (18); heating device (42) with a short-cut line (44) connecting the high-pressure supply line (38) with the low-pressure return line (40) and a heater valve (46) for opening and closing the short-cut line (44), and a control and monitoring unit (43). Temperature management includes automatically controlling a fluid temperature by monitoring the fluid temperature and controlling the heater valve (46).

9 Claims, 1 Drawing Sheet

METHOD AND SYSTEMS FOR CONTROLLING FLUID TEMPERATURE IN A HYDRAULIC SYSTEM OF AN AIRCRAFT POWERED BY AN HPP

RELATED APPLICATION

This application incorporates by reference and claims priority to European patent application 23201292.2, filed Oct. 2, 2023.

TECHNICAL FIELD

The invention relates to a method for automatically controlling a fluid temperature in a hydraulic system of an aircraft, comprising a hydraulic power pack. Further, the invention relates to a hydraulic system of an aircraft, a hydraulic power pack for such a hydraulic system, a control and monitoring unit for such a hydraulic system or such a hydraulic power pack, an aircraft equipped therewith as well as a computer program.

BACKGROUND

A hydraulic system uses a fluid under pressure to drive machinery or move mechanical components. Practically all aircraft make use of some hydraulically powered components. In an aircraft a single hydraulic system or two or more hydraulic systems working together might be used to power any or all of the following components: wheel brakes, nose wheel steering, landing gear retraction/extension, flaps and slats, thrust reversers, spoilers/speed brakes, flight control surface, cargo doors/loading ramps, and so on. Generally, a hydraulic system includes a pressure generator in form of a hydraulic pump, a hydraulic consumer, e.g., in form of a hydraulically driven "motor" (e.g., rotary motor or linear motor such as a hydraulic cylinder) which powers the hydraulically driven component and a hydraulic distribution system (also referred to as "hydraulic conduct system") which contains and channels the fluid throughout the aircraft as required. In most aircraft as present on market, the hydraulic pumps are mounted on the engine accessory gear box and are powered when the engines are running.

Thus, today aircraft's hydraulic systems are continuously running during all flight phases and thereby constantly generates heat. This is a rather passive process, i.e., temperature is not actively controlled and leads to a wider operational temperature range, resulting in an oversizing of the hydraulic system.

In contrast to the most common solution of providing hydraulic pressure with pumps connected to the engines, the invention refers to hydraulic systems in aircraft that are powered by hydraulic power packs (referred to as HPP or HePP for electrically driven hydraulic power packs).

A hydraulic power pack (sometimes referred to as a hydraulic power unit) is a self-contained system that usually includes at a minimum a motor-pump and a fluid reservoir. It works to apply the hydraulic pressure (and flow) needed to drive hydraulic consumers such as motors, cylinders, and other complementary parts of a given hydraulic system. One advantage of such hydraulic power packs is that they can be arranged locally near the hydraulic consumer and can be powered electrically so that there is no need of large hydraulic fluid distribution lines. Another advantage is that the hydraulic system comprising the hydraulic power pack can be powered on demand, i.e., the power pack can be off during some flight phases and only be turned on once a consumer need is present.

SUMMARY

The invention may be embodied is to further enhance the functionality of a hydraulic system comprising a hydraulic power pack.

The invention may be embodied to provide, according to a first aspect, a method for automatically controlling a fluid temperature in a hydraulic system of an aircraft, wherein the hydraulic system comprises a hydraulic power pack including a motor, a hydraulic fluid reservoir and a hydraulic pump,
 at least one hydraulic consumer,
  a high-pressure supply line for supplying the hydraulic consumer with hydraulic fluid under higher pressure,
  a low-pressure return line for returning hydraulic fluid under lower pressure from the hydraulic consumer,
  a heating device including a short-cut line connecting the high-pressure supply line with the low-pressure return line and a heater valve for opening and closing the short-cut hydraulic line, and a control and monitoring unit, wherein the fluid temperature is controlled by: a) monitoring the fluid temperature and b) controlling the heater valve.

According to some embodiments, the heating device is part of the hydraulic power pack. According to an alternative, the heating device is arranged outside the HPP, e.g., as part of a hydraulic conduct system of the hydraulic system. Further, the hydraulic system may comprise several heating devices and several heater valves, e.g., one or a plurality of heater valves and short-cut lines inside and/or outside the hydraulic power pack.

Step a) may comprise step a1) of measuring the fluid temperature of hydraulic fluid in the hydraulic power pack.

Step a) may comprise step a2) of measuring the fluid temperature of hydraulic fluid in the hydraulic fluid reservoir.

Step a) may comprise step a3) of measuring the fluid temperature of hydraulic fluid in the high-pressure line.

Step a) may comprise step a4) of measuring the fluid temperature of hydraulic fluid in the low-pressure line.

Steps a2), a3) and a4) may be omitted in some embodiments. In some embodiments, there are enough data to conclude on the system temperature, e.g., by monitoring/measuring the fluid temperature in the reservoir and/or the outlet especially when the heat capacity/transfer etc is known.

Step a) may comprise step a5) of comparing the fluid temperature with a lower and/or higher threshold.

Step a) may comprise step a6) of determining whether the fluid temperature T is in a range of $0° C. \leq T \leq 60° C.$ Step a) may comprise step a7) of conducting the monitoring by the control and monitoring unit being part of a computer at aircraft level and/or of a control computer of the hydraulic power pack.

Step b) may comprises step b1) of controlling the heater valve to allow a hydraulic short-circuit from the high-pressure supply line to the low-pressure return line in order to warm the hydraulic fluid due to the resulting differential pressure.

Step b) may comprise step b2) of controlling one heater valve for controlling flow through one short-cut hydraulic line or controlling a plurality of heater valves for controlling flow through a plurality of short-cut hydraulic lines.

Step b) may step b3) of conducting the controlling by the control and monitoring unit being part of a computer at aircraft level and/or of a control computer of the hydraulic power pack.

Step b) may comprise step b4) of commanding the heater valve to open whenever the control and monitoring unit detects a fluid temperature below a defined first threshold.

Step b) may comprise step b5) of commanding the heater valve to close whenever the control and monitoring unit detects a fluid temperature above a defined second threshold.

Step b) may comprise step b6) defining at least a lower threshold depending on a predefined viscosity level of the hydraulic fluid.

Step b) may comprise step b7) of defining a temperature range of the hydraulic fluid depending on operational temperature ranges for components of the hydraulic system and/or for the hydraulic fluid.

Step b) may comprise step b8) of controlling the heater valve to ensure that the heating function is active until the fluid temperature is inside an intended range.

Step b) may comprise step b9) of controlling the heater valve to ensure that the heating function is stopped if the temperature is too high.

The method further comprises step c) of monitor flight relevant data to determine the actual flight phase status or ground phase status of the aircraft and conducting the step a) and the step b) depending on the determination of the actual flight phase status or the ground phase status.

The method may further comprise step d) of inhibiting heating while the aircraft is on ground and the fluid temperature is continuously rising.

The method may further comprise step d1) of inhibiting heating if the aircraft is in flight and the fluid temperature is continuously rising.

The method may further comprise step e) of monitoring a trend of the fluid temperature and conducting step b) in dependence from the trend of the fluid temperature.

The method may further comprise step f) of recording fluid temperatures over the time, comparing actual temperature changes over the time with previously recorded temperature changes and conducting step b) in dependence from this comparison.

The method may further comprise the steps:
aa) activating the hydraulic power pack on demand of the hydraulic consumer and deactivating the hydraulic power pack when no hydraulic power is needed by the hydraulic consumer;
bb) monitoring the fluid temperature within the hydraulic power pack, and
cc) when the fluid temperature is lower than a predefined threshold, optionally commanding an isolation valve to isolate the hydraulic consumer from the hydraulic power pack, commanding the heater valve provided within the hydraulic power pack to open a short-circuit for hydraulic fluid internal of the hydraulic power pack, and running the motor and the pump to heat the hydraulic fluid internal of the hydraulic power pack.

While the isolation is a basis solution, it is also possible to do warming without consumer isolation-thus some embodiments do not provide the consumer isolation. The isolation may be used when there is no need to pressurize the system (no consumer activity) in a "power-on-demand" configuration. The embodiments may contain this basis solution and other solutions as an extension to this basic solution (especially internal HPP warming).

According to a first alternative of a second aspect, the invention further provides a hydraulic system of an aircraft, comprising
a hydraulic power pack including a motor, a hydraulic fluid reservoir and a hydraulic pump,
at least one hydraulic consumer,
a high-pressure supply line for supplying the hydraulic consumer with hydraulic fluid under higher pressure,
a low-pressure return line for returning hydraulic fluid under lower pressure from the hydraulic consumer,
a temperature sensor for sensing a fluid temperature of the hydraulic fluid,
a heating device including a short-cut hydraulic line connecting the high-pressure supply line with the low-pressure return line and a heater valve for opening and closing the short-cut hydraulic line, and
a control and monitoring unit configured to control the heater valve in dependence from the fluid temperature.

The control and monitoring unit is configured to control the hydraulic system to execute the steps of the method according to any of the aforementioned embodiments.

According to a second alternative of a second aspect, the invention provides a hydraulic power pack (HPP) for a hydraulic system of an aircraft, the hydraulic power pack comprising a motor, a hydraulic fluid reservoir, a hydraulic pump, a hydraulic output port for supplying a hydraulic consumer with hydraulic fluid under higher pressure, a hydraulic input port for receiving hydraulic fluid under lower pressure returning from the hydraulic consumer, a heating device including a short-cut hydraulic line between the hydraulic output port and the hydraulic input port and a heater valve for opening and closing the short-cut hydraulic line, a temperature sensor for sensing a hydraulic fluid temperature, and a control and monitoring unit configured to control the heater valve in dependence from the fluid temperature.

In some embodiments, the HPP contains one motor, especially one motor-pump. In some embodiments, the HPP contains a plurality of motors, especially a plurality of motor-pumps.

The control and monitoring unit may be configured to control the hydraulic power pack to execute the steps of the method according to any of the aforementioned embodiments.

In some embodiments, the hydraulic power pack further comprises an isolation valve for isolating the output port from the pump, wherein the control and monitoring system is configured to control the hydraulic power pack to execute a heating function for heating the hydraulic fluid within the hydraulic power pack by running the pump and opening the short-cut line while the output port is isolated from the output port by the isolation valve.

The first and second alternatives may be combined such that the hydraulic system of the first alternative is equipped with the hydraulic power pack of the second alternative.

The hydraulic system may further comprise an isolation valve for isolating the hydraulic consumer from the hydraulic pack, wherein the control and monitoring system is configured to control the hydraulic power pack to execute a heating function for heating the hydraulic fluid within the hydraulic power pack by running the pump and opening the short-cut line while the hydraulic consumer is isolated from the hydraulic power pack by the isolation valve.

According to a third aspect, the invention provides a control and monitoring unit for a hydraulic system according to any of the aforementioned embodiments of the hydraulic system or for a hydraulic power pack according to any of the aforementioned embodiments of the hydraulic power pack, wherein the control and monitoring unit is configured to control and monitor the hydraulic system or the hydraulic power pack to execute the steps of the method according to any of the aforementioned embodiments of the method.

According to a further aspect, the invention provides an aircraft comprising a hydraulic system and/or hydraulic pack and/or a control and monitoring unit according to any of the aforementioned embodiments.

According to a further aspect, the invention provides a computer program comprising instructions to cause the hydraulic system or the hydraulic power pack according to any of the aforementioned embodiments to execute the steps of the method according to any of the aforementioned embodiments of the method.

Embodiments of the invention relate to a heating mode in powerpack applications.

Some embodiments propose methods, systems, HPPs and/or units providing a heating mode in hydraulic systems in aircraft that are powered by hydraulic power packs. For such hydraulic systems a thermal management has been evaluated and considered beneficial. The hydraulic systems may be powered by at least one hydraulic power pack are a flight control architecture that mainly relies on electric power for powering flight controls (e.g., the AIRBUS's project "MEAC—More Electric Aircraft Control". One or a plurality of HPPs may be part of such architecture.) Other uses are hydrogen powered aircraft such as the ZEROe—the Airbus Hydrogen Powered aircraft, or a single aisle aircraft such as the Airbus project NSA (Next Single Aircraft).

In some embodiments, the hydraulic system powered by the HPP can be powered "on demand", i.e., the HPP can be off during some flight phases or for larger periods within a flight phase and only be turned on once a consumer need is present.

Generally, hydraulic pumps require higher input power in case of cold fluid due to higher viscosity of the fluid. It is therefore beneficial to ensure the system temperature is stabilized at a temperature near the optimum operation point of the pump and the consumer(s). In some embodiments, this is around 0 to 60° C.

In some embodiments, a heat management system allows to keep this fluid temperature range. The heat management system may be used to keep the fluid temperature within a narrow, predefined range around a given or determined optimum temperature for the system operation. The heat management leads to reduced pressure drops at higher temperatures; less power is required. The sizing of the distribution system (especially pipes, hoses, fitting) can be kept smaller. The components work at a more favourable operation point.

SUMMARY OF DRAWINGS

Embodiments of the invention are explained below referring to the accompanying drawings in which.

DETAILED DESCRIPTION

Figure 1:
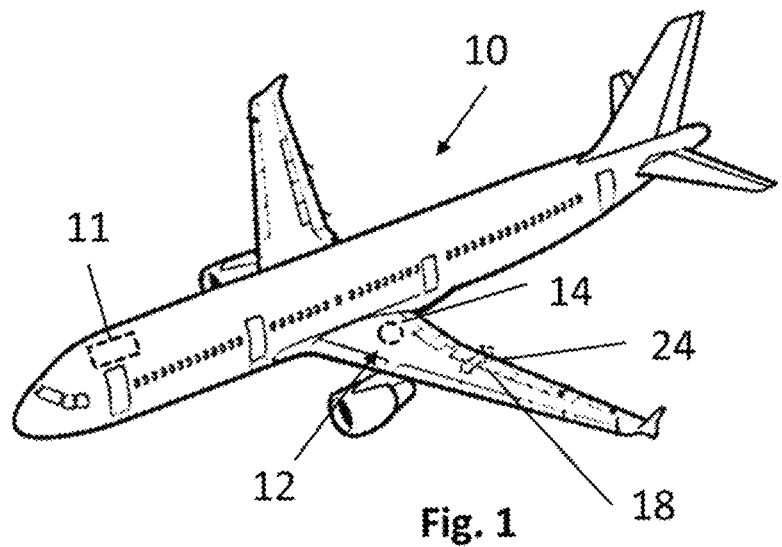
FIG. 1 is a schematic view of an aircraft comprising a hydraulic system powered by a hydraulic power pack.
Figure 2:
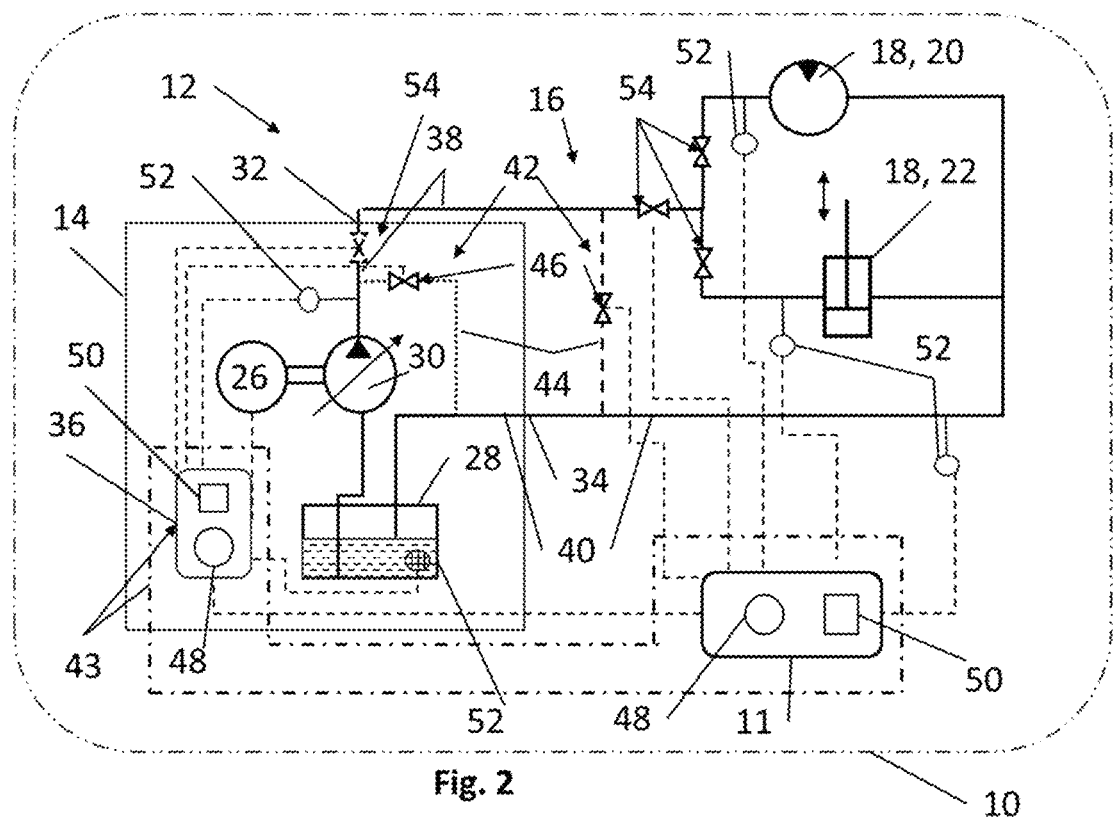
FIG. 2 is a schematic simplified block diagram of an embodiment of the hydraulic system.

FIG. 1 shows an aircraft 10 comprising a control computer 11 at aircraft level and a hydraulic system 12. An example of the hydraulic system 12 is schematically shown in FIG. 2.

The hydraulic system 12 comprises a hydraulic power pack 14, a distribution system 16 and a hydraulic consumer 18. The hydraulic consumer 18 is for example a hydraulic motor 20 or hydraulic cylinder 22. Especially, the hydraulic consumer 18 is an actuator for driving a component of the aircraft 10 such as a flight control element 24.

The hydraulic power pack 14 comprises a motor 26, especially an electric motor, a hydraulic fluid reservoir 28, a hydraulic pump 30, a hydraulic output port 32 for supplying the hydraulic consumer 18 with hydraulic fluid under higher pressure, and a hydraulic input port 34 for receiving hydraulic fluid under lower pressure returning from the hydraulic consumer 18. In some embodiments, the hydraulic power pack 14 further comprises a HPP control computer 36.

In the embodiments shown, the hydraulic system 12 further comprises a high-pressure supply line 38 for supplying the hydraulic consumer 18 with hydraulic fluid under higher pressure, a low-pressure return line 40 for returning hydraulic fluid under lower pressure from the hydraulic consumer 18, a heating device 42 and a control and monitoring unit 43.

The heating device 42 includes or is comprised of a short-cut line 44 connecting the high-pressure supply line 38 with the low-pressure return line 40 and a heater valve 46 for opening and closing the hydraulic short-cut line 44.

In some embodiments, as indicated by a dotted line, the heating device 42 may be arranged internal in the hydraulic power pack 14, wherein the short-cut line 44 connects a HPP internal part of the high-pressure supply line 38, connecting the pump 30 with the output port 32, with a HPP internal part of the low-pressure return line 40, that connects the input port 34 with the fluid reservoir 28.

In some embodiments, as indicated by a dashed line, the heating device 42 may be arranged outside of the hydraulic power pack 14, wherein the short-cut line 44 connects a distribution system part of the high-pressure supply line 38, connecting the output port 32 with the one or several consumers 18, with a distribution system part of the low-pressure return line 40 connecting consumer(s) 18 with the input port 34.

In some embodiments, the hydraulic system 12 has both the internal and the external heating devices 42.

The control and monitoring unit 43 is a control computer including a processor 48 and a memory 50. The memory 50 contains a computer program with instructions to cause the hydraulic system to execute method steps as described in more detail below. The control monitoring unit 43 may be (a part of) the control computer 11 at aircraft level, (a part of) the HPP control computer 36 or may be a combination of several cooperating computers 11, 36.

Further, the hydraulic system 12 comprises one or several temperature sensors 52 for determining a fluid temperature of the hydraulic fluid of the hydraulic system. The temperature sensors 52 are formed by temperature transducers of any kind and are in communication connection with the control and monitoring unit 43. In some embodiments, the temperature sensor 52 or several of plural temperature sensors 52 are arranged inside the HPP 14, especially inside the fluid reservoir 28. The temperature sensor 52 may be arranged at any other point of the hydraulic system 14.

In some embodiments, the hydraulic system 12 further comprises one or several isolation valves 54 controlled by the control and monitoring unit 43. The isolation valves 54 are arranged and configured such that the consumer(s) 18 can be isolated from the HPP 14.

Under control of the control and monitoring unit 43, the following method for controlling the fluid temperature in the hydraulic system 12 is automatically performed.

The fluid temperature in the hydraulic system is controlled by: 1. Monitoring the fluid temperature (typically at hydraulic reservoir 28); 2. The heater valve(s) 46; 3. Monitoring and controlling of the heater valve(s) 46 and/or 4. optionally: isolation valve(s) 54

Monitoring the Fluid Temperature

Typically, the fluid temperature needs to be monitored in a hydraulic system due to safety reasons (overheat) anyway. Sensors 52 can be located in the hydraulic reservoir 28 or at another point in the hydraulic system 12, typically inside the HPP 14 definition.

Especially, a conventional temperature transducer as "state-of-art" design in hydraulic systems is used as temperature sensor 52. The temperature transducer can be located in the hydraulic reservoir 28 or at another point in the system. In embodiments, the temperature sensor(s) 52 is (are) located inside the HPP 14. The monitoring is done by the computer 11 at aircraft level or directly at the HPP control computer 36.

The Heater Valve(s) 46

The heater valve 46 is a device inside the HPP 14 or at different locations in the hydraulic system 12 that allows a "short circuit" from the high-pressure supply line 38 to the low-pressure return line 40. The differential pressure leads to warming of the fluid. A heating due to losses is conducted.

There may be one or several heater valves 46. The heater valve 46 is controlled by the computer 11 at aircraft level or locally by the HPP control computer 36.

The heater valve 46 will be commanded to open whenever the control and monitoring unit 43 detects a temperature below a first (lower) defined threshold, and it will be commanded to close above a defined second (higher) threshold. The first and/or second thresholds are defined such that the first and/or second threshold ensure an operating point of the motor-pump units and system components at: a viscosity value that prevents excessive losses or power demands and/or a fluid temperature that prevents excessive wear of components or fluid degradation due to heat load.

Examples for the thresholds are 0° C. and 60° C.

Monitoring and Controlling of the Heater Valve(s) 46

In some embodiments, the control and monitoring unit 43 is aiming to achieve a certain target value (e.g., 30° C.). Below a threshold of 0° C. the control and monitoring unit 43 commands the heating function. Above 30° C. the heating function is commanded off.

Monitoring and controlling of heater valve(s) 46 is conducted to ensure the heat mode function is active until the fluid temperature is inside the intended range and stopped if the temperature is too high.

The control and monitoring unit 43 monitors and controls the heater valve(s) 46 to ensure the heat mode is active until the fluid temperature is in the intended range and to stop the heat mode when the temperature is too high. Also, the fluid temperature is monitored.

In some embodiments, the control and monitoring unit 43 can monitor flight relevant data to consider relevant flight phases: One example could be to inhibit heating while the aircraft 10 is on ground and the fluid temperature is continuously raising to prevent overheat. In some embodiments, heating is inhibited if the aircraft 10 is in flight and the fluid temperature is continuously rising.

In some embodiments, the control and monitoring unit 43 is configured to conduct a trend monitoring and/or lang term recording to be able to better predict system heating functions and behaviours.

Isolation Valve(s) 54

In some embodiments, the following feature is additionally provided.

The HPP 14 is running in "on demand" mode. In other words, the HPP 14 is activated only in case of consumer demand, otherwise the HPP 14 is stopped.

When the HPP 14 is running in the on-demand mode, the HPP-internal heater valve 46 is activated in flight phases where there is no need of hydraulic power, for an "internal mode" heating only. While the pump 30 of the HPP 14 is running for conducting the internal mode heating, the isolation valve 54 ensures that the HPP-generated power does not power the hydraulic system 12, especially the consumer (s) 18. Instead, the heater valve 46 is used to heat up the fluid volume inside the HPP 14 and the HPP internal reservoir 28 (tank). When, at a later point hydraulic power needs to be provided to the consumer, such preheating will allow the system to operate at a temperature that allows higher performance.

In some embodiments, the on-demand mode and the internal heating mode is automatically conducted with the following steps: aa) activating the hydraulic power pack 14 on demand of the hydraulic consumer 18 and deactivating the hydraulic power pack 14 when no hydraulic power is needed by the hydraulic consumer 18; bb) monitoring the fluid temperature within the hydraulic power pack 14, and cc) when the fluid temperature in the HPP 14 is lower than a predefined threshold, commanding the isolation valve(s) 54 to isolate the hydraulic consumer 18 from the hydraulic power pack 14, commanding the heater valve 46 provided within the hydraulic power pack 14 to open a short-circuit for hydraulic fluid internal of the hydraulic power pack 14, and running the motor 26 and the pump 30 to heat the hydraulic fluid internal of the hydraulic power pack 14.

As shown in FIG. 2, the isolation valve 54 can be located inside the HPP 14 and/or on the external part of the high-pressure supply line 38. In some embodiments, the isolation valve 54 inside the HPP 14 is arranged between the short-cut line 44 and the output port 32. In some embodiments (not shown), the isolation valve 54 and the heater valve 44 are combined in a multi-way valve.

An advantage of this embodiment with internal heating mode is that once the hydraulic system 12 is pressurized, the warm fluid stored in the reservoir 28 will be flowing into the distribution system 16 thereby rapidly heating the distribution system 16 and the consumer(s) 18. Also, the mixture of cold distribution system fluid and the warm HPP internal fluid will generate a mean temperature in the reservoir 28 that is higher than the (cold) system fluid temperature thereby allowing the pump 30 in the HPP 14 to run in an operating point that requires less power.

Method and systems have been described for controlling fluid temperature in a hydraulic system (12) of an aircraft (10) powered by an HPP (14). Especially, a hydraulic system (12) for an aircraft (10) has been described comprising a hydraulic power pack (14) including a motor (26), a hydraulic fluid reservoir (28) and a hydraulic pump (30), at least one hydraulic consumer (18), a high-pressure supply line (38) for supplying the hydraulic consumer (18) with hydraulic fluid under higher pressure, and a low-pressure return line (40) for returning hydraulic fluid under lower pressure from the hydraulic consumer (18). In order to enhance functionality, the hydraulic system (12) further comprises a heating device (42) including a short-cut line (44) connecting the high-pressure supply line (38) with the low-pressure return line (40) and a heater valve (46) for opening and closing the short-cut line (44), and a control and monitoring unit (43). For providing a temperature management, a method for automatically controlling a fluid temperature comprises the steps of: a) monitoring the fluid temperature and b) controlling the heater valve (46).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 aircraft
11 control computer at aircraft level
12 hydraulic system
14 hydraulic power pack (HPP)
16 distribution system
18 hydraulic consumer
20 hydraulic motor
22 hydraulic cylinder
24 flight control element
26 (electric) motor
28 reservoir
30 pump
32 output port
34 input port
36 HPP control computer
38 high-pressure supply line
40 low-pressure return line
42 heating device
43 control and monitoring unit
44 short-cut line
46 heater valve
48 processor
50 memory
52 temperature sensor
54 isolation valve

The invention claimed is:

1. A method for automatically controlling a fluid temperature in a hydraulic system of an aircraft, wherein the hydraulic system comprises:
    a hydraulic power pack including a motor, a hydraulic fluid reservoir and a hydraulic pump,
    at least one hydraulic consumer,
    a high-pressure supply line configured to supply the at least one hydraulic consumer with hydraulic fluid under higher pressure,
    a low-pressure return line configured to return hydraulic fluid under lower pressure from the at least one hydraulic consumer,
    a heating device including a short-cut line connecting the high-pressure supply line with the low-pressure return line and a heater valve configured to open and close the short-cut line, and
    a control and monitoring unit configured to control the fluid temperature,
    wherein the method comprises:
        a) monitoring the fluid temperature within the hydraulic power pack,
        b) controlling the heater valve,
        c) activating the hydraulic power pack on demand of the at least one hydraulic consumer,
        d) deactivating the hydraulic power pack when no hydraulic power is needed by the at least one hydraulic consumer,
        f) when the fluid temperature is lower than a predefined threshold, commanding an isolation valve to isolate the at least one hydraulic consumer from the hydraulic power pack,
        g) commanding the heater valve included with the hydraulic power pack to open a short-circuit for hydraulic fluid in the hydraulic power pack, and
        h) running the motor and the hydraulic pump to heat the hydraulic fluid in the hydraulic power pack.

2. The method according to claim 1, wherein the step a) comprises at least one of:
    a1) measuring the fluid temperature of hydraulic fluid in the hydraulic power pack,
    a2) measuring the fluid temperature of hydraulic fluid in the hydraulic fluid reservoir,
    a3) measuring the fluid temperature of hydraulic fluid in the high-pressure line,
    a4) measuring the fluid temperature of hydraulic fluid in the low-pressure line (40),
    a5) comparing the fluid temperature with a lower and/or higher threshold,
    a6) determining whether the fluid temperature T is in a range of 0° C. to 60° C., or
    a7) conducting the monitoring by the control and monitoring unit being part of a computer at aircraft level and/or of a control computer of the hydraulic power pack.

3. The method according to claim 1, wherein step b) comprises at least one of:
    b1) controlling the heater valve to allow a hydraulic short-circuit from the high-pressure supply line to the low-pressure return line to warm the hydraulic fluid due to the resulting differential pressure;
    b2) controlling one heater valve to control flow through one short-cut hydraulic line or controlling a plurality of heater valves to control flow through a plurality of short-cut hydraulic lines;

b3) conducting the controlling by the control and monitoring unit being part of a computer at aircraft level and/or of a control computer of the hydraulic power pack;

b4) commanding the heater valve to open whenever the control and monitoring unit detects a fluid temperature below a defined first threshold;

b5) commanding the heater valve to close whenever the control and monitoring unit detects a fluid temperature above a defined second threshold;

b6) defining at least a lower threshold depending on a predefined viscosity level of the hydraulic fluid;

b7) defining a temperature range of the hydraulic fluid depending on operational temperature ranges for components of the hydraulic system and/or for the hydraulic fluid;

b8) controlling the heater valve to ensure that the heating function is active until the fluid temperature is inside an intended range; or b9) controlling the heater valve to ensure that the heating function is stopped if the temperature is too high.

4. The method according to claim 1, further comprising:

i) monitoring flight relevant data to determine the actual flight phase status or ground phase status of the aircraft;

j) conducting the step a) and the step b) depending on the determination of the actual flight phase status or the ground phase status;

k) inhibiting heating while the aircraft is on ground and the fluid temperature is continuously raising;

l) inhibiting heating if the aircraft is in flight and the fluid temperature is continuously rising;

m) monitoring a trend of the fluid temperature and conducting the step b) in dependence from the trend of the fluid temperature; and n) recording fluid temperatures over the time, comparing actual temperature changes over the time with previously recorded temperature changes and conducting the step b) in dependence from the comparison of the actual temperature changes and the previously recorded temperature changes.

5. A hydraulic system for an aircraft comprising a hydraulic power pack including a motor, a hydraulic fluid reservoir and a hydraulic pump, at least one hydraulic consumer, a high-pressure supply line configured to supply the at least one hydraulic consumer with hydraulic fluid under higher pressure, a low-pressure return line configured to return hydraulic fluid under lower pressure from the at least one hydraulic consumer, a temperature sensor configured to sense a fluid temperature of the hydraulic fluid, a heating device including a short-cut hydraulic line connecting the high-pressure supply line with the low-pressure return line and a heater valve configured to open and close the short-cut hydraulic line, an isolation valve configured to isolate the at least one hydraulic consumer from the hydraulic power pack, and a control and monitoring unit configured to:
  control the heater valve depending on the fluid temperature,
  control the hydraulic power pack to execute a heating function for heating the hydraulic fluid within the hydraulic power pack by operating the hydraulic pump, and
  opening the short-cut hydraulic line while the at least one hydraulic consumer is isolated from the hydraulic power pack by the isolation valve.

6. The hydraulic system according to claim 5, wherein the control and monitoring unit is further configured to control the hydraulic fluid temperature by:

a) monitoring the hydraulic fluid temperature with the temperature sensor, and b) controlling the heater valve.

7. An aircraft comprising the hydraulic system according to claim 5.

8. A hydraulic power pack for a hydraulic system of an aircraft comprising:

a motor, a hydraulic fluid reservoir, a hydraulic pump, a hydraulic output port configured to supply a hydraulic consumer with hydraulic fluid under higher pressure, a hydraulic input port configured to receive hydraulic fluid under lower pressure returning from the hydraulic consumer, a heating device including:
  a short-cut hydraulic line between the hydraulic output port and the hydraulic input port,
  a heater valve configured to open and close the short-cut hydraulic line,
  a temperature sensor configured to sense a hydraulic fluid temperature, and
  an isolation valve configured to isolate the hydraulic output port from the hydraulic pump, and a control and monitoring unit configured to:
  control the heater valve in dependence from the hydraulic fluid temperature, and
  control the hydraulic power pack to execute a heating function for heating the hydraulic fluid in hydraulic power pack by running the hydraulic pump and opening the short-cut hydraulic line while the hydraulic output port is isolated from the hydraulic pump by the isolation valve.

9. The hydraulic power pack according to claim 8, wherein the control and monitoring unit is further configured to control the hydraulic fluid temperature by:

a) monitoring the fluid temperature with the temperature sensor, and b) controlling the hydraulic heater valve.

* * * * *